INVENTOR.
Robert S. Webb.
BY
Harry R Dumont
ATTORNEY.

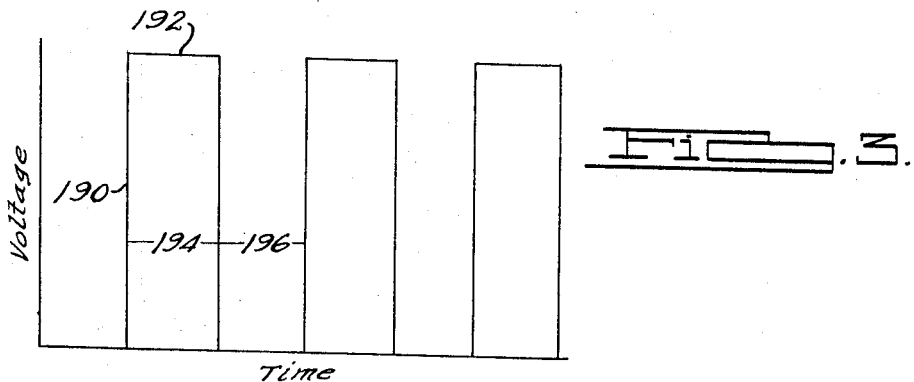
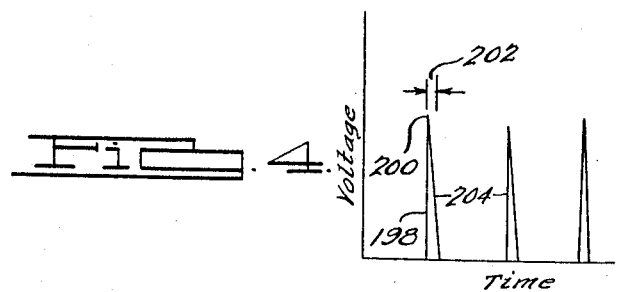
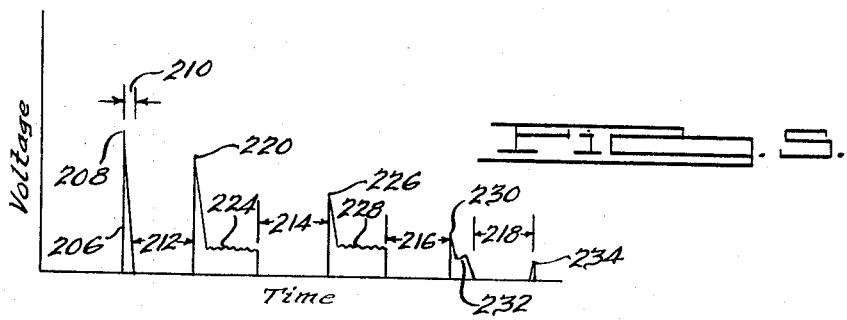
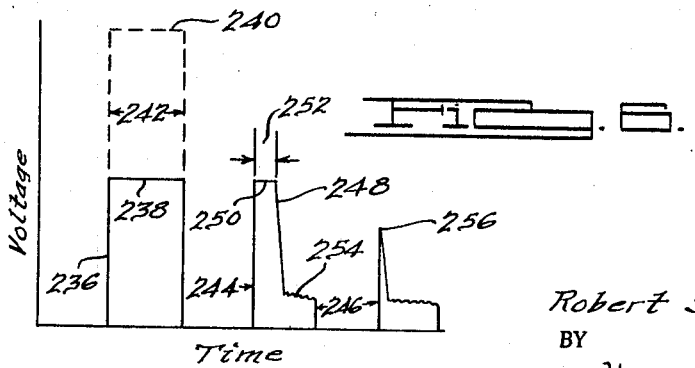

United States Patent Office 3,267,327
Patented August 16, 1966

3,267,327
ELECTRICAL DISCHARGE MACHINING
POWER CIRCUIT
Robert S. Webb, Bloomfield Hills, Mich., assignor to Elox Corporation of Michigan, Troy, Mich., a corporation of Michigan
Continuation of abandoned application Ser. No. 139,418, Sept. 20, 1961. This application Oct. 15, 1963, Ser. No. 316,401
14 Claims. (Cl. 315—127)

This application is a continuation of my application Ser. No. 139,418, filed September 20, 1961, and now abandoned. The aforesaid abandoned application was, in turn, a continuation-in-part of my application Ser. No. 26,526, filed May 13, 1960, and now issued as U.S. Patent 3,018,411.

This invention relates generally to electrical discharge machining power circuits and, more particularly, to an open circuit protection and interruption circuit therefor.

Electrical discharge machining, variously referred to in the art as EDM, spark machining, or arc machining is carried on by passing a series of discrete, localized, extremely high current density discharges across a gap between a tool electrode and a conductive workpiece at sonic or ultrasonic frequencies in the presence of a dielectric fluid for eroding the workpiece.

In electrical discharge machining the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

Present day advanced electrical discharge machining power circuitry uses electronic switches, such as vacuum tubes or transistors, for minutely and accurately controlling the discrete discharges across the gap. An example of this type of machining power circuit responsible for this advanced state of the art is shown in Matulaitis and Lobur United States Patent No. 2,951,969, issued September 6, 1960. A machining power circuit such as that, when combined with a power feed of an improved type as shown in my U.S. Patent No. 2,962,630, issued November 29, 1960, results in a machine having reliable control characteristics and readily usable by machinists having mechanical skill only with no electrical or electronics background as is typical in the machining trades. Matulaitis U.S. Patent No. 2,804,575, issued August 27, 1957, sets forth improved machining circuitry with use of vacuum tubes for switching and contemplates high frequency electrical discharge machining. High frequency, as it is presently considered in the art of electrical discharge machining, is approximately 100 kilocycles at some substantial average machining current such as 15 amperes. While vacuum tube circuitry is capable of much higher frequencies in the megacycle or even kilomegacycle region, the advancements in these aforementioned types of electrical discharge machining circuitry are confined to frequencies approximately below 100 kilocycles for any substantial machining current.

Electrical discharge machining is characteristically an extremely high current, low voltage operation. The actual discharge voltage between electrodes and workpiece is approximately 14 volts and only in extremely specialized circumstances is any higher discharge voltage possible. The normal pulse duration in electrical discharge machining is such that the gap ON-time, or period of current conduction, is short with respect to the total period. This ON-time is typically one-fourth or less of the total pulse time, and for an average machining current of 15 amperes would represent a rectangular current pulse of 60 amperes for a duration of one quarter of the total cycle. Even 60 amperes of current represents a substantial current change at 100 kilocycles. For example, half of the total cycle is 5 microseconds, and if there is assumed to be a linear current rise during this period, the $di/dt$ is $60 \div (5 \times 10^{-6})$ or $12(10^6)$ amperes per second. This means that drop in circuit inductance is 12 volts per microhenry of inductance even at this frequency and current level. It is not at all uncommon for the inherent construction of a typical electrical discharge machining loop, including the power supply output circuitry and the necessary lengthy electrical connections between a movable electrode and workpiece, to constitute between two and five microhenries of inductance. Even at 100 kilocycles with this comparatively small rate of current change, circuit inductive losses can easily approach 60 volts. Presently, every effort is being extended within the industry to maintain the open circuit gap voltage below 100 volts in the interest of operator and machine safety, since the present day electrical discharge machines have the electrode and work, as well as the power connections to the electrode and work, exposed for operator access and consequently inadvertent contact.

A conventionally designed circuit having a maximum open circuit voltage of 100 volts therefore has a very real and rather low limit upon the product of frequency times current that may be achieved. Metal removal rate in electrical discharge machining is a function of machining current. Surface finish, on the other hand, is a function of the quantity of electricity or charge transferred across the gap in any single discharge. The ultimate electrical discharge machine would therefore have the highest possible machining current at the highest possible frequency in order to achieve the fastest machining rate with the finest possible surface finish or accuracy.

Accordingly, it is the principal object of this invention to provide an improved per pulse cut-off circuit where each pulse or discharge from the electronic switch is electronically inspected and maintained within very precise limits of open circuit voltage as well as discharge voltage. A device is provided to limit the open circuit voltage of the machine to a substantially lower voltage than the machining power voltage, which device is operable after initiation of but prior to normal completion of each machining pulse.

Another object is to provide a vacuum tube circuit for limiting the instantaneous peak open circuit voltage in an electrical discharge machining power circuit.

Another object is to provide an improved transistorized circuit for high frequency, high voltage machining including an open circuit voltage limiting device.

A further object is to provide an electrical discharge machining power circuit in which the power is interrupted at the source responsive to an abnormal electrical characteristic of the gap indicating open circuit.

A still further object is to provide an improved power interruption system for a power supply responsive to removal of its load impedance.

Other objects and advantages are disclosed in the following specification, which taken in conjunction with the accompanying drawings show preferred forms of practicing the invention.

In the drawings, in which reference numerals have been used to designate like parts herein referred to:

FIG. 3 is a graphical representation of the voltage waveform exposed between electrode and work in the absence of this open circuit voltage limiting device or with the voltage limiter disconnected;

FIG. 4 is a similar representation of the gap voltage waveform of open circuit voltage with the voltage limiting device of FIG. 1 operative;

FIG. 5 shows a typical train of gap discharge pulses during normal machining conditions for the circuitry of FIG. 1, and;

FIG. 6 shows a similar typical train of gap discharge pulses for the circuit of FIG. 2.

Figure 1:
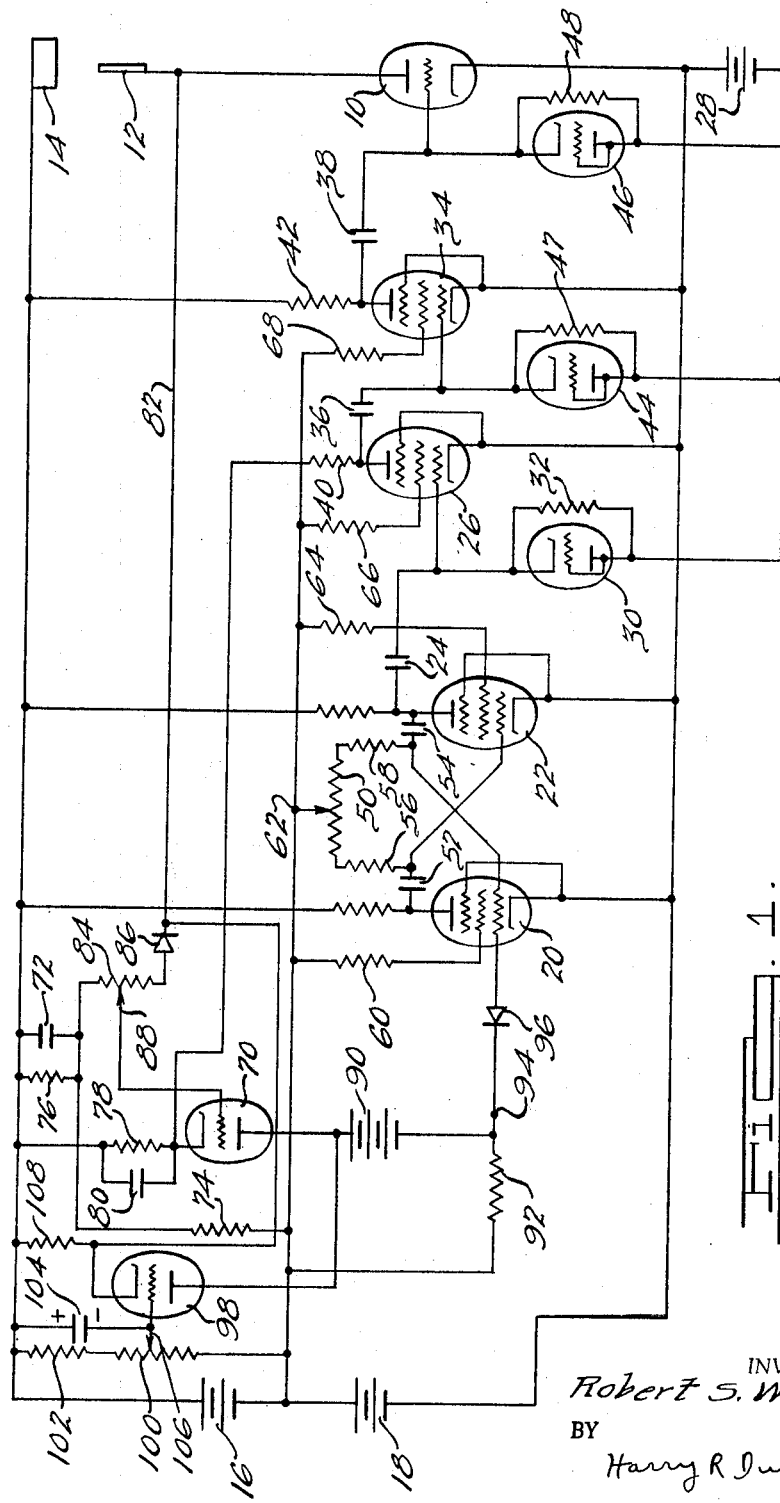
FIG. 1 is a schematic representation of a vacuum tube pulser type electrical discharge machining circuit containing per pulse short circuit protection circuitry and an instantaneous voltage limiting device.

Referring now to FIG. 1 which shows schematically, a direct connected electron tube circuit in which a bank of tubes, represented by triode 10, is connected directly to the electrode 12. The workpiece 14 is connected to the positive terminal of the discharge power supplies 16 and 18. Tube bank 10 has its cathode connected to the negative terminal of voltage 18, thus completing the series EDM power circuit which provides erosive pulses across the machining gap controlled by excitation of the grids of the bank 10.

In precise machining by EDM, it is imperative that the power tube bank be pulsed ON and OFF at precise, sharply defined intervals. That is to say, the voltage waveform between grid and cathode of tube 10 is turned ON and OFF sharply to provide optimum gap discharge. This rectangular drive to the grid of tube 10 is generated by multivibrator tubes 20 and 22 operating according to well-known principles of vacuum tube multivibrator design. It may be seen that in this particular circuit, tube 10 and the gap are ON, or power is supplied to the machining gap, when multivibrator tube 20 is ON, and power bank 10 and the gap are OFF when multivibrator tube 20 is OFF. The rectangular pulsating output of multivibrator tube 22 is connected through coupling capacitor 24 to the control grid of a buffer tube 26. The pulsating signal is clamped to bias 28 through diode 30 and drive or turn ON signal for tube 26 is developed across resistor 32. The rectangular voltage drive tends to be in excess of bias 28 and the excess portion is clipped by the grid of pentode 22 in a manner well known in the electronics art as "resquaring of the pulse" such that the output of tube 22 has an even sharper voltage rise and fall than the output of the multivibrator. In a similar manner, a tube bank represented by pentode 34 amplifies the output from pentode 26 and signal is again resquared at the grid of this tube as well as at the grid of the power tube bank itself. Coupling capacitors 36 and 38 deliver signal from plate load resistors 40 and 42 to the grids of tubes 34 and 10 respectively. Diodes 44 and 46 and drive resistors 47 and 48 shape the drive signal of the respective tubes. The output tube bank 10 consists of many vacuum tubes, perhaps hundreds in number, and in turn requires a drive tube bank in the order of 5 to 50 tubes to furnish drive power of sufficient amplitude. The grid circuit of tube bank 10 is therefore supplied with rectangular pulsating power in the order of 50 to 5000 watts or higher, depending on the size of tube bank 10. Rectangular pulsating power sufficient to drive the grid of a power bank 10 of such size is presently not commercially available in the electronics industry.

An important design feature of this particular circuit is in the multivibrator grid return and rheostat 50. The special characteristic of this particular circuit is that by adjusting rheostat 50 an increase in resistance in one grid circuit automatically decreases resistance in the other circuit, and an analysis of the respective ON and OFF time of each of the multivibrator tubes and the formulas for determining this, shows how to achieve a fixed output frequency. In other words, for equal capacitors 52 and 54, connected in the grid circuits as shown, the time duration of one complete cycle of operation may be represented by:

$$KC(R50+R56+R58)$$

This expression for the discharge time constant is in units of microseconds when resistance is expressed in units of ohms and capacitance is expressed in units of microfarads. The letter K indicates a constant which is the constant for the circuit dependent upon the circuit parameters such as plate voltage gain and the like. This is particularly important in an EDM circuit, since a constant frequency of operation may be maintained and the gap ON-time may be varied directly with the ON-time of multivibrator tube 20 as determined by capacitor 52, resistor 56 and the portion of the rheostat 50 included in the grid return circuit of multivibrator tube 22.

Thus turning the potentiometer to the right to increase the resistance in the grid circuit of tube 22 will cause an increase in the ON-time of tube 20 and corresponding increase in the ON-time of the gap. Since the effect of output tube 10 during ON-time may be approximated by a resistance, the quantity of machining current passed through the gap may be controlled by the respective ON-time of multivibrator tube 20 and therefore tube bank 10, thus giving precise control of the machining current supplied to the gap and permitting infinitesimal adjustments of that machining current while maintaining a fixed machining frequency.

The screen grid of pentode 20 is connected through limiting resistor 60 to screen voltage tap 62. Similarly, the screen grid of pentode 22 is connected through resistor 64, the screen grid of pentode 26 is connected through resistor 66, and the screen grid of pentode 34, through resistor 68, each to screen voltage tap 62.

Consider next the particular operation of the per pulse cut-off tube and its associated circuitry. The operation of this circuitry as power tube bank 10 is pulsed ON, is such that it is capable of supplying power to the machining gap. Prior to the machining pulse, multivibrator tube 20, buffer tube 26, and power tube bank 10 are all cut-off or nonconducting. Per pulse cut-off tube 70 is rendered nonconductive by the D.C. bias stored across capacitor 72 developed across voltage dividing resistors 74 and 76. With cut-off tube 70 nonconductive, operation of the multivibrator is unimpaired and as multivibrator tube 20 turns ON correspondingly buffer tube 26 is limiting resistor 40 and keying resistor 78 which is connected in the cathode circuit of cut-off tube 70. Delay capacitor 80 is shunted across resistor 78 such that the signal from buffer tube 26 is delayed briefly from arriving in the cathode circuit of tube 70.

The time constant of this delay network is very brief and generally in the order of a few microseconds or less, and is intended to permit passage of drive signal to the output tube bank 10. Assuming a condition of open circuit, an increasing open circuit voltage is generated across the working gap and is detected by sensing lead 82 and presented to reference potentiometer 84 through diode 86. The portion of this signal determined by the setting of potentiometer arm 88 is presented to the grid of cut-off tube 70. This signal corresponding exactly to gap voltage renders the grid of tube 70 more negative. After the delay interval achieved through use of capacitor 80, signal is developed across resistor 78 in the cathode lead of cut-off tube 70. This signal is of such a polarity tending to render tube 70 conductive. However, the presence of a portion of the gap voltage at arm 88 cancels this keying signal and thus the cut-off tube remains non-conductive and operation of the circuit is unimpaired and proceeds in accordance with the normal functions of multivibrator tubes 20 and 22.

If the working gap is shorted, or is of such a low voltage that the signal developed at potentiometer arm 88 is insufficient to overcome the keying signal developed across resistor 78, cut-off tube 70 becomes instantaneously conductive. Conduction of the cut-off tube causes electron flow from the negative terminal of floating D.C. supply voltage 90 through resistor 92 to screen voltage tap 62 of the main D.C. power supply. The voltage generated across resistor 92 is substantially in excess of that of screen voltage tap 62 thus causing reference terminal 94 to become negative with respect to the cathode of tube 20. Terminal 94 is rendered sufficiently negative to interrupt conduction of multivibrator tube 20 and trigger the OFF portion of the cycle. During the period of conduction, tube 20 was ON and in-phase with power tube bank 10.

Thus, as cut-off tube 70 renders tube 20 nonconductive, the amplifier instantaneously renders power tube bank 10 nonconductive interrupting the condition of short circuit or low voltage conduction. This interruption lasts for the normal duration of OFF-time or dwell between pulses as determined by multivibrator grid circuit 54, 58, 50 of tube 20. In this manner, the flaw or short circuit in the working gap instantaneously interrupts the particular machining pulse. During normal operation of this circuit, the grid of multivibrator tube 20 is isolated from the cut-off circuitry by diode 96, said diode becoming conductive only during periods of operation of cut-off tubes 70 or 98, at which times terminal 94 is more negative than either cathode or grid of tube 20.

The important feature of this invention concerns the voltage limiting tube 98 and its associated circuitry. The action of per pulse cut-off tube 70 has been described during abnormally low gap discharge voltage conditions. The action of voltage limiting tube 98 is confined to open circuit condition.

It will be seen that the machining gap, in effect, presents a nonlinear load impedance to the power source. At open circuit conditions arising from excessive spacing, the voltage rise at either terminal of the gap tends to reach the level of the power source. To prevent this objectionably high voltage level at the external electrode tool and workpiece elements, voltage limiting tube 98 is included to interrupt power from the source. As the voltage between electrode and work rises to the maximum acceptable voltage for the particular machine as sensed by lead 82, the cathode of tube 98 is carried correspondingly negative. During normal machining conditions or low voltage conditions, the grid of tube 98 is preserved at a fixed negative bias by the voltage developed across potentiometer 100 and resistor 102 storing a D.C. voltage across capacitor 104 of controlled magnitude. As the cathode of tube 98 approaches the voltage stored across capacitor 104, corresponding to a condition of open circuit voltage equal to the desired maximum as determined by the setting of potentiometer arm 106, tube 98 is rendered conductive by the negative voltage across resistor 108. The action of the anode of tube 98 through floating voltage 90, resistor 92, and diode 96 is identical to the action of tube 70 as previously described in that it instantaneously cuts off multivibrator tube 20 which in turn instantaneously shuts off power tube 10. Since no machining current was flowing during this time, the voltage across the gap falls rapidly to zero and multivibrator tube 20 is automatically reset and a normal OFF-time ensues. After the normal OFF-time of tube 20 it pulses again. Should the gap fire at this time below the voltage limits set by tube 98, operation of the circuitry proceeds as previously described. If the gap is shorted, the discharge is interrupted by tube 70 resetting multivibrator tube 20.

From this it can be seen that tube 70 operates to interrupt short circuit condition; tube 98 operates to limit voltage during open circuit condition.

Through operation of these two cut-off tubes, gap voltage and the method of operation is maintained closely within very precise limits. The principal objection to this vacuum tube circuit as shown, is that, immediately upon achieving the maximum permissible voltage on the leading edge of a power pulse, operation of the pulser is interrupted and reset. It is not uncommon in electrical discharge machining for a pulse to reach the normal open circuit voltage, remain at that open circuit voltage for a portion of the normal power pulse duration, whereupon the gap breaks down in mid-pulse to a highly satisfactory metal removing discharge. Such a mid-pulse breakdown condition is eliminated by this circuitry resulting in somewhat lower machining current. The advantage of this circuit, however, is that all metal removing discharges are of the same magnitude and therefore the surface finish is completely uniform containing infinitesimal craters or discharge areas of identical size. For certain types of machined surfaces this precisely uniform surface is more desirable and, in this event, the circuitry of FIG. 1 or a circuit operating on a similar principle is best employed.

Figure 2:
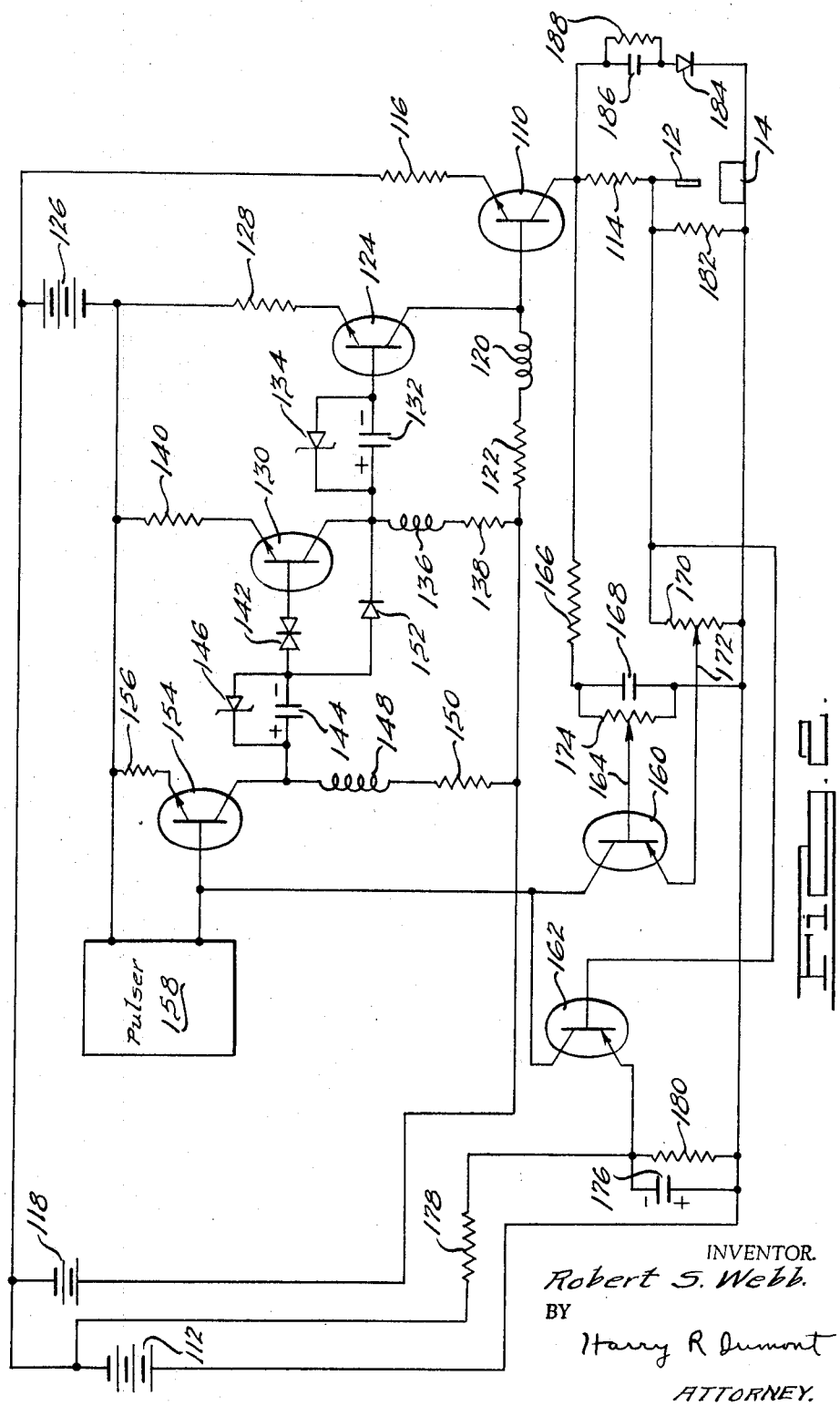
FIG. 2 is a somewhat similar circuit constructed of high frequency, high voltage NPN transistors, also including an open circuit voltage limiting device.

The circuitry of FIG. 2 overcomes this singular objection of triggering the multivibrator upon reaching the maximum acceptable open circuit voltage and a relatively high gain amplifier is included to limit the open circuit voltage to this maximum without interfering with the operation of the pulser. Thus, the open circuit voltage is maintained at this maximum acceptable limit for the duration of the normal ON-time of the power pulse and the gap is free to break down at any time during this period.

This example of improved form of machining power circuit is composed entirely of NPN transistors. It is well known in the semiconductor art that NPN transistors have inherently faster switching times, shorter rise and fall times, and more favorable saturation characteristics than PNP transistors. It is known that this occurs because electrons may be mobilized far more rapidly than positive ion holes and the amplifying carriers in NPN transistors are electrons due to the inherent characteristics of the devices. For this reason, in a high speed-high power EDM circuit, the ultimate in switching speed at high power is achieved exclusively through use of NPN transistors and except for individual unit cost, this circuit is by far the most satisfactory, where switching times of the order of a microsecond or less are required in order to achieve high speed, super finish machining.

The machining power transistor bank in FIG. 2 is shown as transistor 110 and operates in conjunction with D.C. machining power supply 112 to switch power between workpiece 14, electrode 12, current limiting resistor 114, and balancing resistor 116. The drive characteristics of FIG. 2 are somewhat similar to FIG. 1 in that the power bank 110 is switched normally ON by conduction through drive supply 118. Transistor 110 is rendered conductive by electron flow from the negative terminal of supply 118 through balancing resistor 116, the emitter-base circuit of transistor 110, choke 120, resistor 122, in an action similar to FIG. 1 in which tube bank 10 is switched ON through capacitor 38 and resistor 42.

As transistor 124 is rendered conductive, bias supply 126 is applied directly to the base of output transistor bank 110. Electron flow is momentarily retarded by choke 120 and a sharp turn-OFF electron flow occurs from bias supply 126, balancing resistor 128, emitter-collector of transistor 124, base-emitter of transistor 110, balancing resistor 116 to the positive terminal of bias 126, thereby sharply rendering transistor 110 nonconductive. After the delay interval of choke 120, an additional electron flow occurs around loop 124, 120, 122, 118, 126, and 128 because of the higher total voltage of this series connections of drive supply 118 and bias supply 126. This increased current flow continues through choke 120 and resistor 122 until transistor 124 becomes sharply nonconductive. At that time, choke 120 induces a voltage in such a manner to sharply accelerate turn-ON of transistor 110 and is blocked from the circuitry of transistor 124 since it is connected in the collector lead of transistor 124 rather than the emitter circuit.

Transistor 124 is rendered sharply nonconductive by conduction of transistor 130. During the period of conduction of transistor 124, drive electron flow occurs from the negative terminal of bias supply 126, through balancing resistor 128, emitter-base of transistor 124, bias capacitor 132 and reference diode 134, choke 136, resistor 138, to the positive terminal of drive supply 118. As transistor 130 is rendered sharply conductive thereby connecting bias capacitor 132 to the base-emitter of transistor 124 a sharp turn-OFF electron flow occurs from bias capacitor 132 through the base-emitter circuit, resistor 128, resistor 140, through the emitter-collector circuit of transistor 130. An additional shunt electron flow occurs from the negative terminal of bias 126, balancing resistor 140, emitter-collector of transistor 130, choke 136, resistor 138, and drive supply 118. At this time, increased current flow occurs through choke 136 and resistor 138 since there is no additional voltage drop through bias capacitor 132 and reference diode 134. As transistor 130 is rendered sharply nonconductive, this increased electron flow accelerates turn-ON of transistor 124 as is characteristic of these choke accelerating circuits. Similarly, turn-ON of transistor 130 occurs from the negative terminal of bias supply 126 through balancing resistor 140, emitter-base circuit of transistor 130, through double anode reference diode 142, bias capacitor 144, reference diode 146, choke 148, resistor 150, and drive supply 118. In this amplifier circuit, transistors 124 and 154 are rendered conductive in-phase to turn-OFF or sharply switch OFF transistor bank 110. Transistor 130 conducts in-phase with transistor 110. As mentioned earlier, it is extremely important that a very narrow ON-time be possible in advanced machining circuits and for this reason, it is extremely important that transistors be sharply switched OFF and less important that they be sharply switched ON. Therefore, the important stages of amplification switch succeeding stages OFF rather than ON, thereby eliminating turn-OFF delay due to storage time and turn-OFF time. This assures an extremely narrow ON-time during conditions of drive calling for an extremely narrow output pulse. Transistor 130 is therefore phased oppositely, in other words, it turns ON to turn ON machining power transistor bank 110. For this reason, diode 152 and double anode diode 142 are incorporated to insure that transistor 130 operates in its nonsaturated region thereby eliminating the storage time caused by saturating drive. Any tendency to overdrive transistor 130 in its turn-ON circuit through choke 148, resistor 150 causes the voltage from emitter to collector to fall sharply. As the total voltage from emitter to collector and the series drop required by diode 152 falls below that of the emitter base circuit and double anode reference diode 142, electron flow occurs from the minus terminal of supply 126 through balancing resistor 140, emitter-collector of transistor 130, diode 152, bias capacitor 144, choke 148, resistor 150 thereby shunting a portion of the drive current of transistor 130. With proper selection of the drop across double anode diode 142, this assures nonsaturating drive of transistor 130 which in turn eliminates undesirable storage time assuring fast switching characteristics of this transistor.

As in the other stages, transistor 130 is sharply biased nonconducting by conduction of its drive transistor, in this instance, transistor 154, thereby causing electron flow from the minus terminal of bias capacitor 144 through double anode diode 142, base-emitter circuit of transistor 130, balancing resistor 140, resistor 156, emitter-collector of transistor 154, to the positive terminal of bias capacitor 144, thereby sharply biasing transistor 130 nonconductive. At this time, choke 136 kicks to block diode 152 sharply blocking this diode and preventing loss of turn-OFF current from this shunt circuit.

Turn-ON of transistor 130 is accelerated in an identical manner to the other stages by the increased electron flow through its choke and 148 and resistor 150 caused by the interruption of increased conduction through transistor 154.

As in the case of FIG. 1, pulser 158 conducts to render transistor 154 and transistor 124 conductive to sharply interrupt conduction of power transistor 110. Similarly, during conduction of the power transistor 110, pulser 158 is nonconductive and short circuit cut-off transistor 160, and spill-over voltage limiting transistor 162, intervene in the event of short circuit or abnormally low gap voltage or limited open circuit voltage, to cause conduction of transistor 154 similarly sharply biasing transistor 110 nonconducting. In this circuit, cut-off transistor 160 operates quite similarly to tube 70 of FIG. 1, except that the circuit components are, of course, corrected for this NPN drive circuit.

A keying voltage is developed negative to positive from keying reference potentiometer arm 164 to workpiece 14 by conduction of power transistor bank 110. As in the circuitry of FIG. 1, this keying signal is delayed by resistor 174 and capacitor 168. Potentiometer 170 is connected directly across the gap and a portion of gap voltage exists at tap reference arm 172. If the reference set at 164 is more negative or of lower value than that of 172, corresponding to a low voltage across the machining gap, transistor 160 is rendered sharply conductive. During this failure condition, drive electron flow for transistor 160 occurs from supply 112, balancing resistor 116, emitter-collector of transistor 110, resistor 166, potentiometer 174, base-emitter of transistor 160, through the lower portion of potentiometer 170. Amplified output electron flow occurs from bias supply 126, resistor 156, emitter-base of transistor 154, collector-emitter of transistor 160, through the lower portion of potentiometer 170 thereby triggering transistor 154 into conduction and sharply interrupting conduction of the output transistor bank 110 through the regenerative action of the shorted gap and the decreasing drive signal.

If the portion of gap voltage as determined by potentiometer arm 172 is higher than the keying reference, transistor 160 is of course biased nonconducting and machining proceeds in accordance with the selected ON-time and frequency of pulser 158.

If the gap spacing is too large to permit a discharge within the acceptable open circuit voltage limit of the machine, cut-off transistor 162 is rendered operative to limit the open circuit voltage. An open circuit reference voltage bias is established across capacitor 176 by the action of divider resistors 178 and 180. As the open circuit voltage rises to a condition slightly more negative than the voltage stored across capacitor 176, transistor 162 is rendered partially conductive. This in turn renders transistor 154 partially conductive through the amplified output of transistor 162, and in turn renders output power transistor bank 110 partially nonconductive through the action of amplifying transistors 154, 130, 124. Usually some amount of resistance is provided in shunt with the working gap in a transistor circuit to provide for the minute normal leakage through transistors during their off-biased condition. During a full OFF condition the voltage across this resistor 182 is less than that required to sustain gap discharge. During this condition of open circuit, however, the amplifier action of spill-over voltage limiting transistor 162 is such that the voltage across resistor 182 and the gap is limited sharply to a value slightly in excess of the bias across capacitor 176. By slightly in excess, I mean approximately one-half volt higher than the voltage across capacitor 176. Thus it can be seen that for all practical purposes the maximum open circuit voltage is limited to the voltage across capacitor 176, and through action of limiting transistor 162, power transistor bank 110 is maintained sufficiently conductive on open circuit to maintain this striking voltage across resistor 182 and the working gap.

By "striking voltage" is meant that gap peak voltage that exists for sufficient time just prior to each gap discharge to breakdown and ionize the dielectric filled gap thereby causing the discharge. The time required for the dielectric breakdown is somewhat dependent upon the magnitude of voltage for a particular gap, but is in the order of a microsecond. Transient voltages of much higher voltage and much shorter duration may exist across the gap without causing breakdown and are thus not included.

Since neither transistor 162 or cut-off transistor 160 interfere with the operation of the pulser on open circuit, the output voltage is therefore limited to the approximate voltage stored on capacitor 176 through the nonregenerative amplifier effect of transistor 162, and during short circuit the output transistor bank is rendered sharply nonconductive by the regenerative amplifier effect of the shorted working gap and the resultant increase in power transistor 110 impedance with partial conduction of short circuit cut-off transistor 160. Thus, the short circuit protection action is regenerative to sharply cut-off all conduction through the gap and the open circuit cut-off transistor is nonregenerative to limit the open circuit gap voltage to the desired maximum.

During a condition of gap discharge voltage below the limit determined across capacitor 176, the full accelerating voltage of supply 112 is applied to the power transistor 110 and the corresponding current limiting resistor 114. Generally speaking, noninductive current limiting resistance, such as resistor 114, is provided to limit the maximum current of the machining power circuit. In certain types of high frequency power circuits the circuit inductance alone is sufficient to limit the maximum current by the maximum rate of $di/dt$ as described above. In such cases, noninductive resistor 114 may be eliminated, provided sufficient drive and current handling capability is provided to the power bank 110 to handle the inductively increasing current, and provided a damping diode 184 is provided to limit the turn-OFF voltage across transistor 110 to the maximum collector-base rating of the particular device. Provided the breakdown rating of transistor 110 is significantly above machining power voltage 112, a decelerating network consisting of capacitor 186 and resistor 188 may be provided in series with rectifier 184 for decelerating the inductive transient current between power discharges. In such a circuit, resistor 114 may be replaced entirely by the unintentional, but very necessary and inherent, discharge loop inductance.

Thus this circuit provides extremely high acceleration for much higher machining currents at much higher frequencies than heretofore possible particularly with limited open circuit voltage machines. Improved transistors capable of carrying currents as high as 100 amperes per single device having specialized construction for extremely high switching speeds make it possible to handle currents of 100 amperes or more at frequencies of 1 megacycle or higher thereby permitting extremely efficient electrical discharge machining of much higher current and higher frequency than heretofore possible.

Referring now to FIG. 3, an open circuit voltage waveform is shown in the absence of a per pulse cut-off voltage limiting circuit. This voltage waveform represents the gap voltage as the electronic switch is pulsed alternately ON and OFF during an open circuit condition when the spacing between electrode and work is too large for discharge. Upon closure of the electronic switch, the gap voltage rises along line 190 to a maximum open circuit voltage magnitude 192 considerably in excess of the safe operating voltage or in excess of the maximum gap spacing desired according to part tolerance. This full open circuit voltage lasts for duration 194 at which time it then falls substantially to zero and remains at low voltage for the OFF-time of the electronic switch corresponding to duration 196.

While an open circuit condition is shown here, it would be equally possible that a spacing corresponding to magnitude 192 would be unacceptable according to part tolerance when considering the size of the electrode, or, for example, when using a preformed punch to machine its own die plate in a blanking die.

FIG. 4 shows the effect upon this open circuit voltage condition of the limiting circuitry of FIG. 1, in which gap voltage rises along line 198 to magnitude 200 which corresponds to the cut-off or voltage limit level. The gap is instantaneously triggered OFF and, after a very minute delay corresponding to the switching time of the amplifier as represented by duration 202, the voltage falls to zero. As previously described, the circuitry in FIG. 1 triggers the OFF portion of the cycle as represented by duration 204. For the same frequency tap or OFF-time condition as represented by duration 196 in FIG. 3, duration 204 between pulses is identical. Since there is no ON-time, the effective repetition rate has increased correspondingly and thus represents a series of extremely narrow spikes of voltage limited in magnitude by the open circuit per pulse cut-off device.

FIG. 5 shows an actual machining condition where the circuitry of FIG. 1 in which the first pulse of voltage corresponding to an open circuit condition rises along line 206 to magnitude 208 corresponding to the cut-off level where it is triggered OFF and falls after the brief duration 210 corresponding to 202 of FIG. 4. After the normal OFF-time, corresponding to duration 212 which is equivalent to 204 in FIG. 4 and also equal to 214, 216 and 218 of FIG. 5, the ON-time pulse is repeated. For the second pulse in this train, the gap breaks down at magnitude 220 and falls sharply to the gap discharge voltage 224 which is approximately 15 volts. At the end of the normal ON-time, the OFF-time cycle is triggered for duration 214. Similarly, the third pulse in this train fires the gap at voltage magnitude 226 and similarly falls to the same gap voltage corresponding to 224 shown for this third pulse as magnitude 228. The fourth pulse breaks down at magnitude 230 and after a small portion of the cycle falls below the acceptable minimum voltage and is interrupted at 232 by the action of the lower voltage cut-off circuit. After normal OFF-time 218, another ON pulse is triggered and in this instance, the gap is shown as short circuited rising only to magnitude 234 which is below the low voltage cut-off circuit, whereupon the OFF-time voltage is again triggered thus protecting the electrode, workpiece and the machine components themselves from damaging short circuit currents.

FIG. 6 shows a train of pulses demonstrating the significant difference of the circuitry of FIG. 2, in which the gap voltage rises along line 236 and during an open circuit condition is limited by the circuitry of FIG. 2 to open circuit voltage 238. Voltage magnitude 240 is shown as the true total supply voltage which has been effectively limited to the lower voltage 238 in accordance with the teachings of this invention. This open circuit pulse exists for duration 242 corresponding to the full ON-time of the previous figures for equivalent circuitry. After this open circuit pulse an OFF-time pulse is triggered as duration 244. A similar OFF-time pulse of duration 246 is triggered after the second power pulse. The second power pulse of FIG. 6 rises along line 248 to open circuit magnitude 250. After a small portion of the ON-time cycle corresponding to duration 252, this second pulse breaks down to a normal machining pulse whereupon the normal gap discharge voltage corresponding to voltage 254 prevails for the remaining duration of this pulse and machining takes place during this latter portion of the pulse. The third pulse in this train is shown as breaking down on the leading edge of the discharge at voltage magnitude 256, and falling to a normal discharge voltage just as similar magnitudes 224 and 228 of FIG. 5.

In the above examples, the electrode is shown as connected to the negative output of the machining power supply and the workpiece to the positive output. Present day knowledge indicates that in certain specialized and improved forms of machining that polarity may be reversed.

It is essential in each case that discrete pulses of the same polarity be applied in each case and that polarity be selected in accordance with known principles. The above examples apply equally well to either polarity of machining.

In the above two schematic diagrams and the accompanying description and voltage waveforms, I have shown and described this new principle of operation of a high frequency precision electrical discharge machine. As mentioned above, the two important functions of this open circuit voltage limiting circuitry are: (1) to provide a maximum peak gap voltage which is safe to operator and machine even for an extremely high frequency, high current, high source voltage machining power circuit; and (2) a means of limiting the maximum striking distance and resulting gap or clearance between the electrode and workpiece for this high performance circuitry. It is apparent from the above disclosure that this voltage limiting circuitry is used only in cases where the total supply voltage exceeds the maximum desired gap voltage. In the circuitry of FIG. 1 employing vacuum tubes, this is usually the case because of the high voltage drop required across vacuum tubes during full current conduction. This tube voltage drop in itself is frequently in excess of 100 volts at full rated current of the device, and this additional open circuit voltage placed across the gap would be objectionable for the reasons outlined above.

This disclosure contains reference to transistors or vacuum tubes or other "electronic switches." It follows that with proper redesign of the circuit any "electronic switch" may be substituted. By "electronic switch" is meant any electronic control device having three or more electrodes consisting of at least two principal electrode terminals in the power circuit operable to be rendered alternately conductive and nonconductive. The conductivity between the power electrodes is controlled by a control electrode within the switch responsive to drive from an external control circuit whereby the conductivity of the power circuit is controlled statically or electrically without movement of mechanical elements within the switch. Examples of electronic switches are vacuum tubes or transistors operated or driven by rectangular pulses or in a Class-B or Class-C mode. The electronic switch may have various rise and fall characteristics but its important characteristic is that discrete pulses are produced.

In disclosing these two examples of preferred forms of circuitry, it is not intended to limit the invention to the circuits shown herein. The principles set forth herein are applicable to a plurality of types of electrical discharge machining power circuits and, further, applicable to a great variety of electrical power circuits in which a power interruption of the source is required responsive to open circuit conditions at the load terminals.

I claim, as my invention:

1. Apparatus for machining a conductive workpiece by means of intermittent electrical discharge across a dielectric filled gap between an electrode tool and the workpiece, comprising a source of machining power, an electronic switch having a control electrode and having its principal electrodes connected between said source and said gap, means for rendering said switch alternately conductive and nonconductive to provide discrete impulses across said gap, a voltage limiting means operatively connected to the control electrode of said switch for limiting its output on gap open circuit to a predetermined lower voltage magnitude than said source, and means for rendering said voltage limiting means operable after initiation of but prior to normal completion of each discrete impulse.

2. The combination as set forth in claim 1 in which said voltage limiting means comprises a second electronic switch having a control electrode and a pair of principal electrodes and a means for sensing gap voltage is operatively connected to the control electrode and one of said principal electrodes of said second switch for controlling its output, said second switch having its power output operatively connected to the control electrode of said first switch.

3. The combination as set forth in claim 1 in which a reference voltage source and a gap voltage sensing means are operatively connected to said voltage limiting means for rendering it operable responsive to a preselected relationship between the aforesaid reference and gap voltages.

4. Apparatus for machining a conductive workpiece by means of intermittent electrical discharge across a dielectric filled gap between an electrode tool and the workpiece comprising a source of machining power, an electronic switch having a control electrode and a pair of principal electrodes connected between said source and said gap, a pulser operatively conected to said switch for rendering it alternately conductive and nonconductive to provide machining pulses across said gap, a voltage limiting means operatively connected to the control circuit of said switch for reducing the output of said switch on open gap electrode to substantially zero voltage, and means for rendering said voltage limiting means operable after initiation of but prior to normal completion of each machining pulse.

5. The combination as set forth in claim 4 in which said voltage limiting means includes a second electronic switch having its control electrode and one principal electrode connected across said gap through a voltage reference and its output operatively connected to the control electrode of said first mentioned switch.

6. Apparatus for machining a conductive workpiece by means of intermittent electrical discharge across a dielectric filled gap between an electrode tool and the workpiece; comprising a source of machining power, an electronic power switch having a control electrode and a pair of principal electrodes, said principal electrodes operatively connected to said source and said gap and periodically operable between conductive and nonconductive states to provide machining power pulses thereacross, an electronic cut-off switch having a control electrode and a pair of principal electrodes and a means for sensing gap voltage operatively connected to one of said electrodes of said cut-off switch, said cut-off switch operable in response to gap open circuit to inhibit conduction of said power switch and cut-off power from said source, and means for enabling the operation of said cut off switch after initiation of but prior to normal completion of each machining pulse.

7. The combination as set forth in claim 6 in which a voltage reference is connected to the control electrode and one principal electrode of said cut-off switch, said sensing means is connected between the gap and one principal electrode of said cut-off switch and the other principal electrode of said cut-off switch is operatively connected to the control electrode of said power switch.

8. Apparatus for machining conductive workpiece by means of intermittent electrical discharge across a dielectric filled gap between an electrode tool and the workpiece comprising, a source of machining power, at least one transistor having its emitter and collector serially connected between said source and said gap, a pulser for rendering said transistor alternately conductive and nonconductive to provide discrete pulses to said gap, a voltage limiting means for limiting the output of said transistor on gap open circuit to a predetermined voltage magnitude lower than said source, and means for enabling the operation of said voltage limiting means after initiation of but prior to normal completion of each of said pulses.

9. The combination as set forth in claim 8 in which said voltage limiting means comprises a second transistor having its control electrode and one principal electrode operatively connected across said gap through a reference voltage source.

10. The combination as set forth in claim 9 in which said second transistor has its base and emitter connected across said gap through said voltage reference source and its collector operatively connected to and controlling the operation of said first mentioned transistor.

11. The combination as set forth in claim 10 in which an amplifier is connected between said pulser and said first mentioned transistor, said second transistor having its collector operatively connected to said amplifier for limiting its output to said first mentioned transistor.

12. A power interruption circuit for an electrical circuit operating in the pulsed mode to provide pulses to a load impedance comprising, a source of power, a periodically operated electronic switch having a control electrode and a pair of principal electrodes, said principal electrodes connected to said source and said load impedance for providing pulses thereto, a voltage limiting means operatively connected to the control electrode of said switch for interrupting its output, means for sensing load voltage in excess of a predetermined level and operatively connected between said load impedance and said voltage limiting means for initiating its operation, and means enabling the operation of said voltage limiting means after initiation of but prior to normal completion of each of said pulses.

13. Apparatus for machining a conductive workpiece by means of intermittent electrical discharge across a dielectric filled gap between an electrode tool and the workpiece comprising, a source of machining power, a periodically operated electronic switch having a control electrode and a pair of principal electrodes, said principal electrodes connected to said source and said gap for providing machining pulses thereacross, a voltage limiting means operatively connected to said control electrode of said switch for reducing its output to substantially zero voltage responsive to gap open circuit, and means for rendering said voltage limiting means operable after initiation of but prior to normal completion of each machining pulse.

14. Apparatus for machining a conductive workpiece by means of intermittent electrical discharge across a dielectric filled gap between an electrode tool and the workpiece comprising, a source of machining power, a periodically operated electronic switch having a control electrode and a pair of principal electrodes, said principal electrodes operatively connected to said source and said gap for providing machining pulses thereacross, a voltage limiting means operatively connected to said control electrode of said switch for reducing its output to substantially zero voltage responsive to gap open circuit, said voltage limiting means comprising a second electronic switch having its control electrode and one principal electrode operatively connected across said gap through a reference voltage source, and means for rendering said voltage limiting means operable after initiation of but prior to normal completion of each machining pulse.

References Cited by the Examiner
UNITED STATES PATENTS

| | | | |
|---|---|---|---|
| 1,283,715 | 11/1918 | Florandin et al. | 315—308 |
| 2,265,602 | 12/1941 | Journeaux | 315—127 |
| 2,854,615 | 9/1958 | Light | 317—31 |
| 2,914,704 | 11/1959 | Nesler et al. | 317—31 |
| 3,018,411 | 1/1962 | Webb | 219—69 |
| 3,098,192 | 7/1963 | Levy et al. | 307—88.5 |

JOHN W. HUCKERT, *Primary Examiner.*

D. E. PITCHENIK, J. D. KALLAM, R. SANDLER,
*Assistant Examiners.*